No. 851,133. PATENTED APR. 23, 1907.
W. E. HIXON.
BALL BEARING BOXING FOR VEHICLE AXLES.
APPLICATION FILED FEB. 19, 1906.
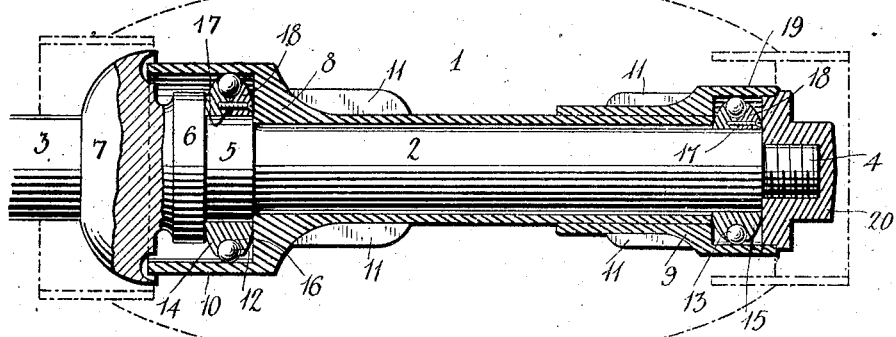
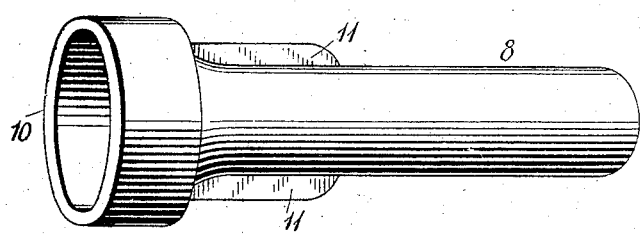
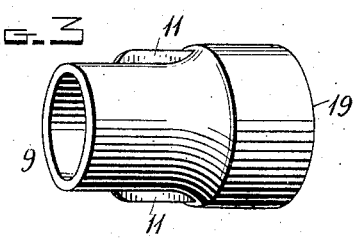
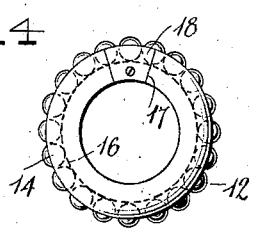
Witnesses
Inventor
William E. Hixon
Attorney

UNITED STATES PATENT OFFICE.

WILLIAM E. HIXON, OF ST. LOUIS, MISSOURI, ASSIGNOR OF ONE-FOURTH TO JOHN REECE, ONE-FOURTH TO CHARLES HECHT, AND ONE-FOURTH TO A. J. TILDEN, ALL OF ST. LOUIS, MISSOURI.

BALL-BEARING BOXING FOR VEHICLE-AXLES.

No. 851,133.   Specification of Letters Patent.   Patented April 23, 1907.

Application filed February 19, 1906. Serial No. 301,890.

*To all whom it may concern:*

Be it known that I, WILLIAM E. HIXON, a citizen of the United States, residing at St. Louis, in the county of St. Louis City and State of Missouri, have invented certain new and useful Improvements in Ball-Bearing Boxing for Vehicle-Axles; and I do declare the following to be a full, clear, and exact description of the invention, such as will enable others skilled in the art to which it appertains to make and use the same.

My invention relates to improvements in ball bearings and more particularly to a ball bearing boxing for vehicle axles.

The object of the invention is to improve and simplify the construction of devices of this character and thereby render the same more durable and efficient and less expensive.

With the above and other objects in view, the invention consists of certain novel features of construction, combination and arrangement of parts as will be hereinafter described and claimed.

In the accompanying drawings,—Figure 1 is a longitudinal sectional view through the hub of a vehicle wheel, with my invention applied thereto; Figs. 2 and 3 are detail views of the two sections of the boxing, and Fig. 4 is a detail view of one of the bearing ball cages.

Referring to the drawings by numeral, 1 denotes the hub of a vehicle wheel which is adapted to rotate upon the spindle 2 of a vehicle axle 3. This spindle is slightly tapered and has at its outer end a reduced screw-threaded portion 4 and at its inner end a slightly enlarged portion 5, upon the inner side of which latter is formed an annular stop collar 6. The usual annular dust shield or cap 7 is formed or provided upon the inner end of said collar, as clearly shown in Fig. 1 of the drawings. Fitted into the bore or opening in the hub 1 is a boxing which consists of two telescoping sections 8–9 which are tubular in form and are inserted in the said bore or opening from its opposite ends. The inner section 8 is of slightly less length than the spindle 2 and has formed at its inner end an enlarged portion 10 which is of cylindrical form and adapted to fit over the collar and into the dust-guard or hood 7. The outer and smaller section 9 of the boxing is similar in form, its smaller inner end being adapted to snugly fit the outer end of the section 8. These sections of the boxing are prevented from rotating in the bore or opening in the hub 1 by forming upon them longitudinally extending ribs or tongues 11, as clearly shown in the drawings. Friction between the spindle and the boxing is reduced by the provision of ball bearings 12–13, which are mounted in removable cages 14–15. The latter are in the form of annular bands or rings adapted to fit the spindle 2 and formed in their outer surfaces or peripheries with annular grooves or raceways 16 in which the balls are retained, the balls being inserted in and removed from said grooves or raceways through recesses 17 formed in said cages and closed by removable plates 18. The cage 14 is adapted to fit upon the enlarged portion 5 at the inner end of the spindle, and against the stop collar 6, so that its bearing balls 12 will engage the inner face of the enlarged portion 10 of the boxing section 8. The cage 15 is adapted to fit upon the outer end of the spindle 2 and against the outer end of the boxing 8, so that the bearing balls 13 will engage the inner face of the enlarged outer end 19 of the boxing section 9. The wheel is retained upon the spindle and the parts are held in their normal positions shown in Fig. 1 by a cap nut 20 which is screwed upon the reduced end 4 of the spindle and is adapted to fit into the enlarged end 19 of the boxing section 9 so as to close the same and prevent the entrance of dust and the like.

Having thus described my invention, what I claim as new and desire to secure by Letters Patent is:—

The combination of an axle spindle having a cylindrical enlarged portion and an annular shoulder at its inner end, said shoulder being at the outer side of said enlarged portion, and said spindle being provided at its outer end with a shoulder and a reduced, screw-threaded portion, an axle box having annular shoulders at its inner and outer ends, its inner shoulder bearing against the enlarged portion of the spindle, an annular ball cage on said enlarged portion between the inner shoulders of the spindle and the box and removable from the spindle and the box, a similar ball cage on the spindle and bearing against the outer shoulder of the box and also removable from the spindle, a cap screwed directly on the reduced, outer end of the spindle to retain the box thereon, bearing against the outer side of the outer ball cage and also bearing against and closing the outer end of the box, each of said ball cages having annular, peripheral grooves forming ball races, and bearing balls in said grooves retained therein by the sides of the grooves, said balls bearing directly against the bore of the box.

In testimony whereof I have hereunto set my hand in presence of two subscribing witnesses.

WILLIAM E. HIXON.

Witnesses.
    CHARLES SACHSE,
    JOHN REECE.